US006973201B1

(12) United States Patent
Colmenarez et al.

(10) Patent No.: US 6,973,201 B1
(45) Date of Patent: Dec. 6, 2005

(54) PERSON TAGGING IN AN IMAGE PROCESSING SYSTEM UTILIZING A STATISTICAL MODEL BASED ON BOTH APPEARANCE AND GEOMETRIC FEATURES

(75) Inventors: Antonio J. Colmenarez, Peekskill, NY (US); Srinivas Gutta, Buchanan, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 727 days.

(21) Appl. No.: 09/703,423

(22) Filed: Nov. 1, 2000

(51) Int. Cl.[7] .............................................. G06K 9/00
(52) U.S. Cl. ..................................................... 382/103
(58) Field of Search ................................ 382/103, 226, 382/159, 160, 115, 118, 181

(56) References Cited

U.S. PATENT DOCUMENTS

| | | | | |
|---|---|---|---|---|
| 4,051,458 | A | | 9/1977 | Morton ..................... 340/146.3 |
| 5,185,815 | A | * | 2/1993 | Brandstetter ................ 382/211 |
| 5,550,928 | A | * | 8/1996 | Lu et al. ...................... 382/116 |
| 5,825,908 | A | | 10/1998 | Pieper et al. ............... 382/131 |
| 5,999,651 | A | * | 12/1999 | Chang et al. ............... 382/215 |
| 6,005,959 | A | | 12/1999 | Mohan et al. .............. 382/110 |
| 6,185,314 | B1 | * | 2/2001 | Crabtree et al. ............ 382/103 |
| 6,188,777 | B1 | * | 2/2001 | Darrell et al. .............. 382/103 |
| 6,542,621 | B1 | * | 4/2003 | Brill et al. .................. 382/103 |
| 6,590,999 | B1 | * | 7/2003 | Comaniciu et al. ......... 382/103 |

FOREIGN PATENT DOCUMENTS

| | | | | |
|---|---|---|---|---|
| DE | 3602299 A1 | 7/1987 | ............ G07C 9/00 |
| WO | WO 9641567 | 12/1996 | |

OTHER PUBLICATIONS

"Face detection with information-based maximum discrimination", Colmenarez, A.J.; Huang, T.S.;Computer Vision and Pattern Recognition, 1997. Proceedings., 1997 IEEE Computer Society Conference on , Jun. 17-19, 1997. pp.: 782-787.*
"A probabilistic framework for embedded face and facial expression recognition", Colmenarez, A.; Frey, B.; Huang, T.S.;Computer Vision and Pattern Recognition, 1999. IEEE Computer Society Conference on. , vol.: 1, Jun. 23-25, 1999. pp.: 597 vol. 1.*
"Mixtures of local linear subspaces for face recognition" Frey, B.J.; Colmenarez, A.; Huang, T.S.; Computer Vision and Pattern Recognition, 1998. Proceedings. 1998 IEEE Computer Society Conference on , Jun. 23-25, 1998. Pp.: 32-37.*
"Detection and tracking of faces and facial features", Colmenarez, A.; Frey, B.; Huang, T.S.;Image Processing, 1999. ICIP 99. Proceedings. 1999 International Conference on , vol.: 1 , 1999. pp.: 657-661 vol. 1 .*

(Continued)

*Primary Examiner*—Jose L. Couso
*Assistant Examiner*—Tom Y. Lu
(74) *Attorney, Agent, or Firm*—Gregory L. Thorne

(57) ABSTRACT

An image processing system processes a sequence of images to generate a statistical model for each of a number of different persons to be tagged so as to be identifiable in subsequent images. The statistical model for a given tagged person incorporates at least one appearance feature, such as color, texture, etc., and at least one geometric feature, such as shape or position of a designated region of similar appearance within one or more images. The models are applied to subsequent images in order to perform a person detection, person location and/or person tracking operation. An action of the image processing system is controlled based on a result of the operation.

3 Claims, 4 Drawing Sheets

OTHER PUBLICATIONS

Colmonarez et al: "Embedded face and facial expression recognition," Image Processing, 1999. ICIP 99. Proceedings. 1999 International Conference on KOBE, Japan Oct. 24-28, 1999, pp. 633-637.

Darrell et al: "Integrated person tracking using stereo, color, and pattern detection," International Journal Of Computer Vision, 2000, Kluwer Academic Publishers, etherlands, 'Online! vol. 37, No. 2, pp. 175-185.

Liu et al: "Face Recognition Using Shape And Texture," Proceedings 1999 IEEE Computer Society Conference On Computer Vision And Pattern Recognition, Los Alamitos, CA, IEEE, vol. 1, Jun. 23, 1999, pp. 598-603.

\* cited by examiner

PERSON TAGGING IN AN IMAGE PROCESSING SYSTEM UTILIZING A STATISTICAL MODEL BASED ON BOTH APPEARANCE AND GEOMETRIC FEATURES

FIELD OF THE INVENTION

The present invention relates generally to the field of image processing, and more particularly to techniques for implementing a person tagging feature in an image processing system.

BACKGROUND OF THE INVENTION

Person tagging in image processing systems refers generally to the process of characterizing a person observed in an image or sequence of images of a video signal, and using the characterization to determine if the same person is present in one or more subsequent images. A detected person is "tagged" by association with the characterization, and can thereby be identified as the tagged person in subsequent images. The process of person tagging is thus distinct from a person recognition process in that it does not necessarily involve definitive identification of a given person as being a particular known individual. Instead, it simply generates an indication that a person in a current image is believed to match a person detected in a previous image. The person tagging process is also referred to as person matching.

Conventional person tagging generally involves the use of either appearance-based or geometry-based detection algorithms. The appearance-based algorithms include techniques such as template matching and color histograms. Examples of features used in geometry-based algorithms include size, shape, etc. The conventional techniques, however, have been unable to combine appearance and geometric features in a manner which provides more efficient and effective person tagging for an image processing system.

SUMMARY OF THE INVENTION

The present invention solves the above-noted problem of conventional person tagging techniques by providing a method and apparatus in which appearance features and geometric features are both incorporated into a statistical model of a particular tagged person. The statistical models generated for a given set of persons present in images of a given video segment or other image sequence may be used for detection, location and tracking of the persons in subsequently-processed images.

In accordance with one aspect of the invention, an image processing system processes a sequence of images to generate a statistical model for each of a number of different persons to be tagged so as to be identifiable in subsequent images. The statistical model for a given tagged person incorporates at least one appearance feature, such as color, texture, etc., and at least one geometric feature, such as shape or position of a designated region of similar appearance within one or more images. The models are applied to subsequent images in order to perform a person detection, person location and/or person tracking operation. An action of the image processing system is controlled based on a result of the operation.

In accordance with another aspect of the invention, the statistical model for a given tagged person may be generated by separating one or more images into a number N of different regions of similar appearance.

In accordance with a further aspect of the invention, the statistical model generated for a given person may be in the form of a likelihood probability function which indicates the likelihood that the person is present in a given image or set of images.

As noted previously, a significant advantage of the present invention is that it utilizes statistical models which incorporate both appearance and geometric features. The use of models which combine these different types of features significantly improves the performance of the person tagging process. For example, such an approach ensures that the system will be less likely to confuse persons crossing one another or persons partially occluded by other objects in given image sequence.

The present invention can be used in a wide variety of image processing applications, such as video conferencing systems, video surveillance and monitoring systems, and human-machine interfaces.

DETAILED DESCRIPTION OF THE INVENTION

Figure 1:
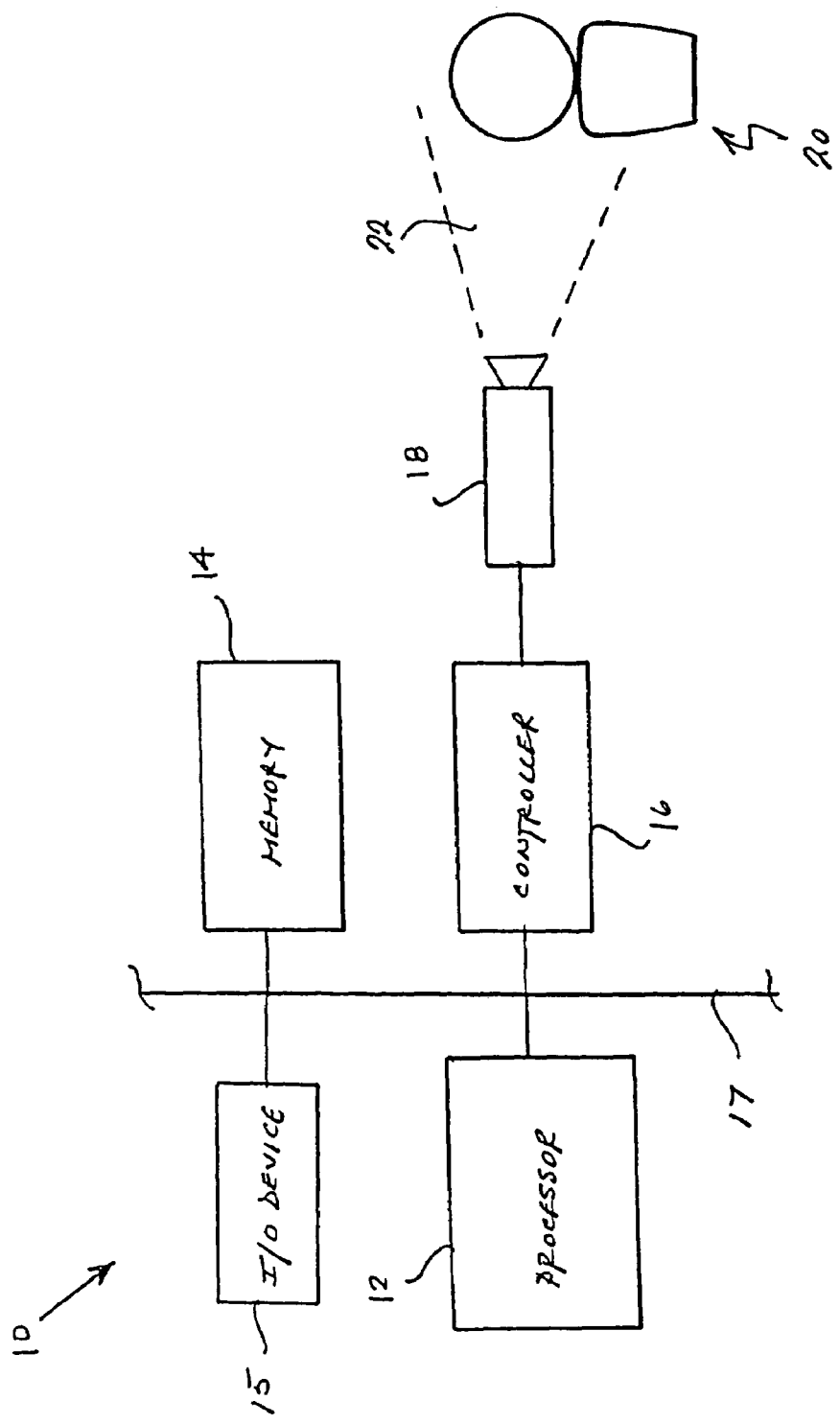
FIG. 1 is a block diagram of an image processing system in which the present invention may be implemented.

FIG. 1 shows an image processing system 10 in which person tagging techniques in accordance with the invention may be implemented. The system 10 includes a processor 12, a memory 14, an input/output (I/O) device 15 and a controller 16, all of which are connected to communicate over a set 17 of one or more system buses or other type of interconnections. The system 10 further includes a camera 18 that is coupled to the controller 16 as shown. The camera 18 may be, e.g., a mechanical pan-tilt-zoom (PTZ) camera, a wide-angle electronic zoom camera, or any other suitable type of image capture device. It should therefore be understood that the term "camera" as used herein is intended to include any type of image capture device as well as any configuration of multiple such devices.

The system 10 may be adapted for use in any of a number of different image processing applications, including, e.g., video conferencing, video surveillance, human-machine interfaces, etc. More generally, the system 10 can be used in any application that can benefit from the improved person tagging capabilities provided by the present invention.

In operation, the image processing system 10 generates a video signal or other type of sequence of images of a person 20. The camera 18 may be adjusted such that the person 20 comes within a field of view 22 of the camera 18. A video signal corresponding to a sequence of images generated by the camera 18 is then processed in system 10 using the person tagging techniques of the invention, as will be described in greater detail below. An output of the system may then be adjusted based on the detection of a particular tagged person in a given sequence of images. For example, a video conferencing system, human-machine interface or other type of system application may generate a query or other output or take another type of action based on the detection of a tagged person. Any other type of control of an action of the system may be based at least in part on the detection of a tagged person.

Elements or groups of elements of the system 10 may represent corresponding elements of an otherwise conventional desktop or portable computer, as well as portions or combinations of these and other processing devices. Moreover, in other embodiments of the invention, some or all of the functions of the processor 12, memory 14, controller 16 and/or other elements of the system 10 may be combined into a single device. For example, one or more of the elements of system 10 may be implemented as an application specific integrated circuit (ASIC) or circuit card to be incorporated into a computer, television, set-top box or other processing device.

The term "processor" as used herein is intended to include a microprocessor, central processing unit (CPU), microcontroller, digital signal processor (DSP) or any other data processing element that may be utilized in a given image processing system. In addition, it should be noted that the memory 14 may represent an electronic memory, an optical or magnetic disk-based memory, a tape-based memory, as well as combinations or portions of these and other types of storage devices.

The present invention provides improvements over conventional person tagging techniques through the use of statistical models based on both appearance features and geometric features. The term "tagging" as used herein refers generally to the generation of a statistical model characterizing a particular person in one or more images of a given image sequence. A person that has been "tagged" in this manner can then be detected, located and/or tracked in one or more subsequent images of the same sequence or of another sequence.

Figure 2:
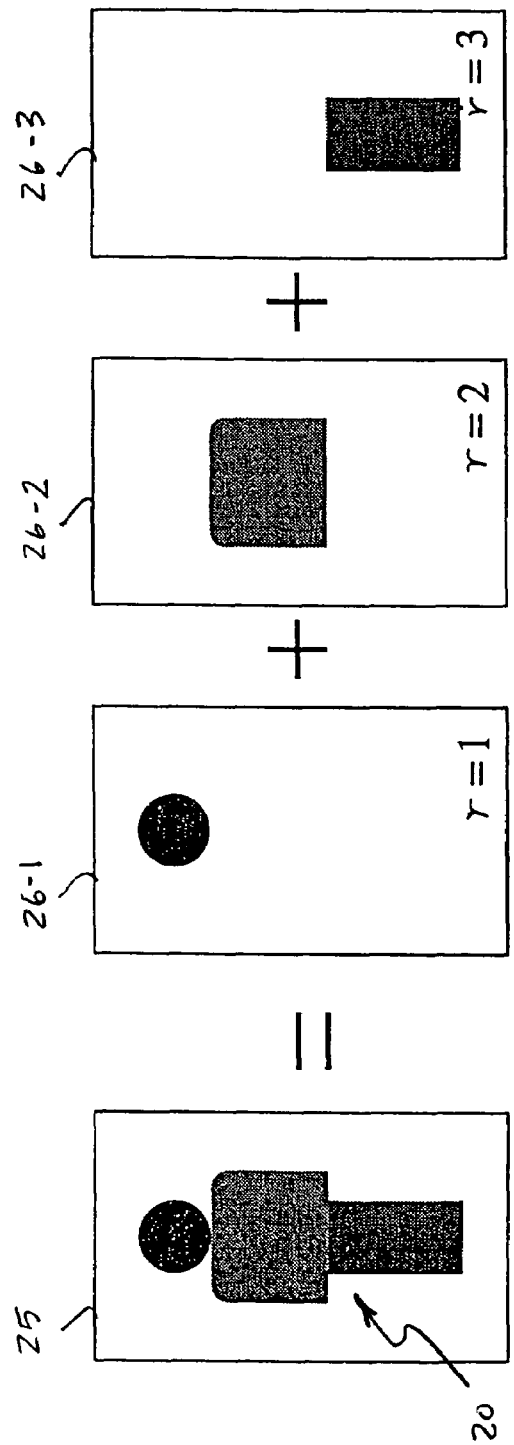
FIG. 2 illustrates an example person tagging process in accordance with the present invention.

FIG. 2 illustrates an example of a person tagging process in accordance with the present invention. An image 25 which includes person 20 is generated and processed in system 10 such that the image is segmented into a number N of different regions of similar appearance. The index r is used to identify a particular one of the regions. In this example, the image 25 is segmented into a total of N= 3 different regions corresponding to portions 26-1, 26-2 and 26-3 of the original image 25. $P(I|\Omega)$ denotes the likelihood probability function of a statistical model generated for a given person $\Omega$, and indicates the likelihood that the person $\Omega$ is present in a given image I. The likelihood probability function $P(I|\Omega)$ of the statistical model for person $\Omega$ may be computed as $$P(I|\Omega) = \sum_{r=1,2,\ldots N} P(R_r|\Omega)P(r|\Omega,$$

where $R_r$ is a function of at least one appearance feature and at least one geometric feature. The appearance features may include color, texture, etc., and the geometric features may include region shape as well as relative region position within the image.

The general person tagging process illustrated in FIG. 2 involves building statistical models of persons from one or more images and using those models for detection and location of the tagged persons in subsequent images.

The process can also be configured to provide tracking of a tagged person, as will now be described in detail in conjunction with FIG. 3. Let $P(I|T, \xi, \Omega)$ be the likelihood probability function of the statistical model of the person $\Omega$. T is a linear transformation used to capture global motion of the person in the image space, and $\xi$ is a discrete variable introduced to capture the state of the local motion of the person at a given point in time, where the term "local motion" is intended to include articulated motion, i.e., the relative motion of different parts of a whole. For example, the position of a person in a room can be obtained from the linear transformation T, while the pose of the person (standing, sitting, etc.) can be determined from the discrete variable $\xi$.

Figure 3:
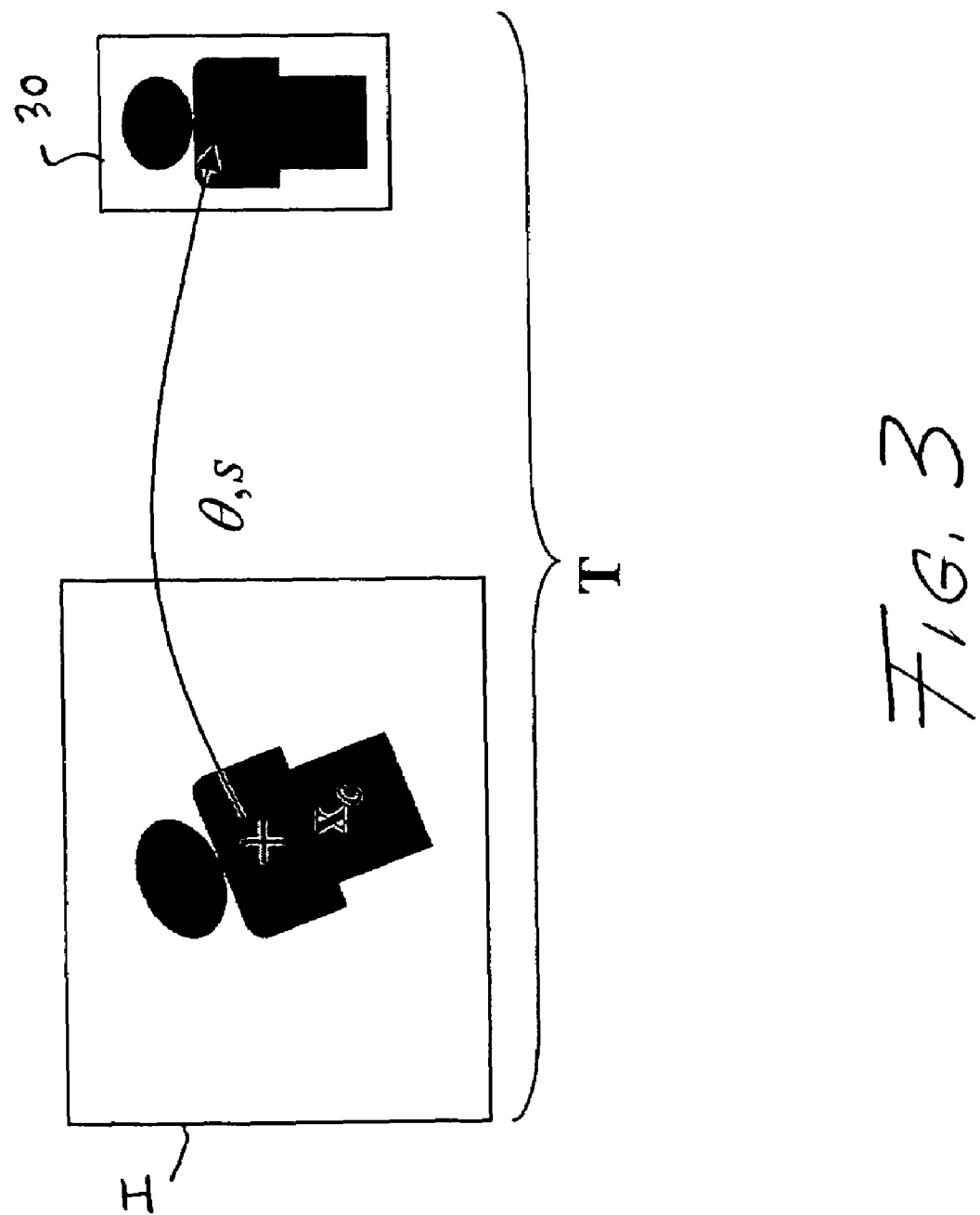
FIG. 3 illustrates a translation operation that may be utilized in a person tagging process in accordance with the present invention.

FIG. 3 illustrates the operation of the linear transformation T. As shown in the figure, the linear transformation T is used to obtain a sub-window 30 of the image I that is invariant to rotation and scale. It may be implemented, for example, using a bilinear interpolation technique with a reference point $x_c$ in the input image I, a rotation angle $\theta$, and a scaling factor s.

The above-noted local motion is modeled using a discrete set of states $\{\xi_1, \xi_2, \ldots \xi_M\}$ of the variable $\xi$ to capture M different poses of the person $\Omega$.

The detection and location of the person $\Omega$ in the image I in the person tagging process of the invention may be implemented using the following maximum likelihood search:

$$T^* = \arg\max_T \sum_{\forall \xi} P(I|T, \xi, \Omega) P(\xi|\Omega.$$

Tracking a tagged person, in contrast to detection and location, takes advantage of the history of the known positions and poses of the person from previous images, e.g., previous frames of a given video segment. For a video segment $V_t = \{I_0, I_1, \ldots, I_t\}$, the likelihood probability $P(V_t|T_t, \xi_t, T_{t-1}, \ldots T_0, \xi_0, \Omega$ is maximized to obtain the optimum trajectory of the person $T_0', \xi_0, T_1', \xi_1, \ldots, T_t', \xi_t\}$. This maximum likelihood search provides tracking of a tagged person, and can be efficiently implemented using well-known conventional techniques such as the Viterbi algorithm or a forward-backward algorithm.

The likelihood probability of a video sequence can be written in terms of the likelihood probability of individual frames as follows:

$$P(V_t|T_t, \xi_t, T_{t-1}, \xi_{t-1}, \ldots, T_0, \xi_0, \Omega = $$
$$P(I_t|T_t, \xi_t, \Omega)P(T_t|T_{t-1}, \ldots, T_0, \Omega)P(\xi_t|\xi_{t-1}, \ldots \xi_0, \Omega$$

where $P(T_t|T_{t-1}, \ldots T_0$ characterizes global motion model and could be implemented using, e.g., a Kalman filter, and $P(\xi_t|\xi_{t-1}, \ldots, \xi_0, \Omega$ characterizes local motion, and could be implemented as a first order Markov model using a transition matrix.

In accordance with the invention, different statistical models of the type described above are generated, one for each person present in a given video segment or other type of image sequence. The person tagging process can then provide detection, location and tracking by associating the trajectory of each tagged person with an identifier of the best matching model.

As noted previously, a significant advantage of the present invention is that it utilizes statistical models which incorporate both appearance and geometric features. The use of models which combine these different types of features significantly improves the performance of the person tagging process. For example, it ensures that the system will be less likely to confuse persons crossing one another or persons partially occluded by other objects in the sequence of video frames.

The generation of the statistical models based on both appearance and geometric features will now be described in greater detail. For simplicity and clarity of illustration, the pixels in an image I of a person $\Omega$ may be considered independent from one another. In other words, $$P(I|T, \xi, \Omega) = \sum_{pix \in I} P(pix|T, \xi, \Omega).$$

As previously noted in conjunction with FIG. 2, r is an index to regions of similar appearance and N is the total number of such regions, r=1, 2, . . . N, so that:

$$P(pix|T, \xi, \Omega) = \max_{r=1,\ldots,N} [P(pix|r, T, \xi, \Omega)P(r|\xi, \Omega)],$$

where P(pix|r, T, $\xi$, $\Omega$ is the probability of observing the pixel pix assuming that it belongs to the r-th region of the person's model on that pose, and P(r|$\xi$, $\Omega$ is the prior probability of the region at that pose. In order to handle occlusions and new exposures, a dummy region may be added with a constant probability as follows:

$$P(pix|r_{occlusion}, T, \xi, \Omega)P(r_{occlusion}|\xi,\Omega)=P_{occlusion}.$$

Every pixel in the image may be characterized by its position x (a two-dimensional vector), and by its appearance features f (color, texture, etc.), so that:

$$P(pix|r,T,\xi,\Omega)=P(x|r,T,\xi,\Omega)P(f|r,T,\xi,\Omega,$$

where P (x|r, T, $\xi$, $\Omega$ and P (f|r, T, $\Omega$ may both be approximated as Gaussian distributions over their corresponding feature spaces. The above-noted appearance features vector f can be obtained for a given pixel from the pixel itself or from a designated "neighborhood" of pixels around the given pixel. As previously noted, examples of such appearance features include color and texture. Color features may be determined in accordance with parameters of well-known color spaces such as RGB, HIS, CIE, etc. The texture features may be obtained using well-known conventional techniques such as edge detection, texture gradients, Gabor filters, Tamura feature generation, etc.

Figure 4:
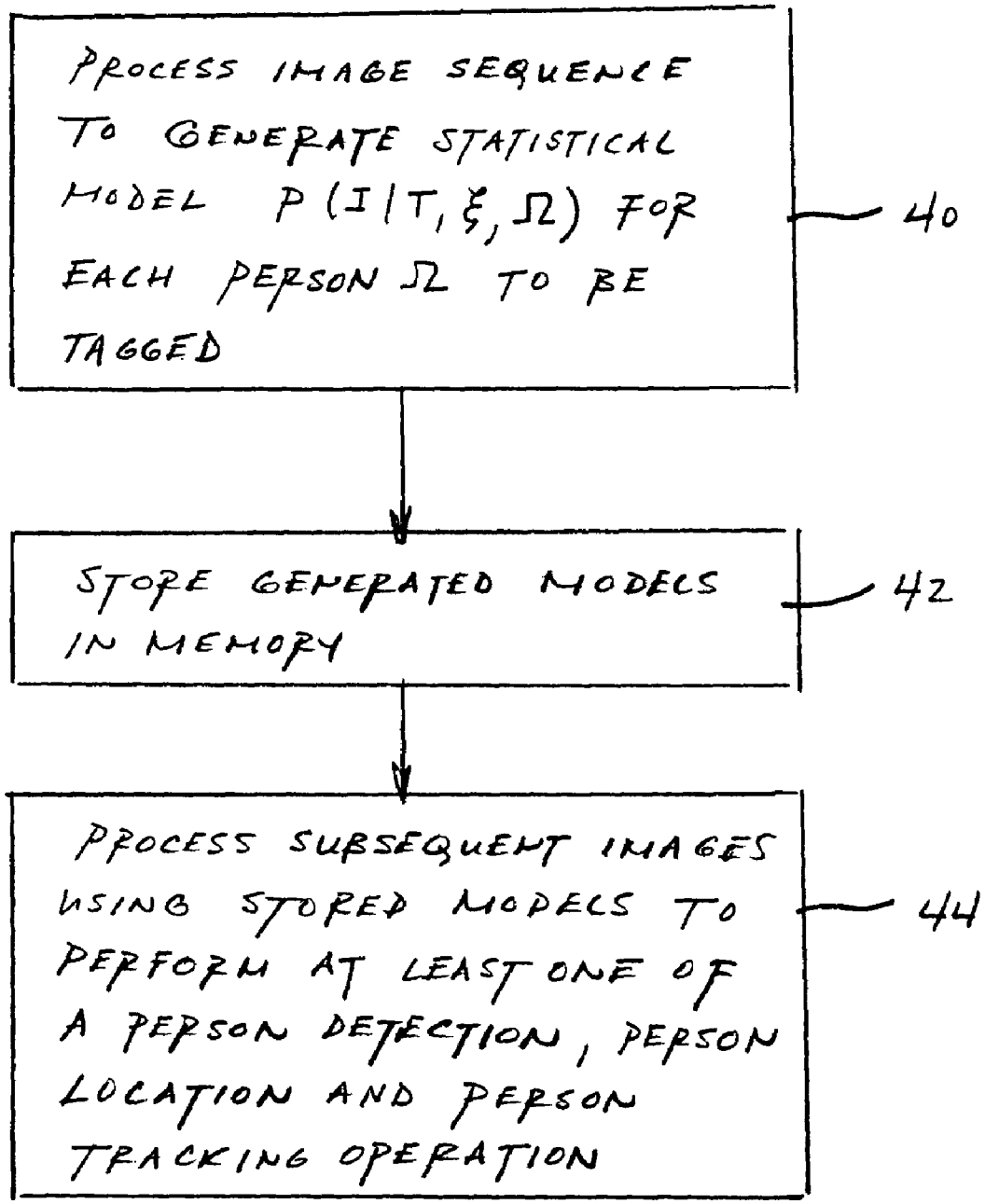
FIG. 4 is a flow diagram of an example person tagging process in accordance with the present invention.

FIG. 4 is a flow diagram summarizing the above-described person tagging process of the present invention. In step 40, a video segment or other type of image sequence is processed to generate an appearance and geometry based statistical model P(I|T,$\xi$, $\Omega$ for each person $\Omega$ to be tagged. In step 42, the resulting model or set of models is stored in a memory of the image processing system, e.g., in memory 14 of system 10. Finally, in step 44, one or more subsequent images are processed using the stored models to perform at least one of a person detection, person location and person tracking operation. The one or more subsequent images may be subsequent images from the same video segment or other image sequence, or from a different image sequence. The processing operations of steps 40, 42 and 44 may be carried out using software executed by processor 12 of system 10.

The above-described embodiments of the invention are intended to be illustrative only. For example, the techniques of the invention can be implemented using a variety of different person tagging processes, including processes involving any one or more of person detection, person location and person tracking. In addition, the invention can be used to provide person tagging capability in a wide variety of applications, including video conferencing systems, video surveillance systems, and other camera-based systems. Furthermore, the invention can be implemented at least in part in the form of one or more software programs which are stored on an electronic, magnetic or optical storage medium and executed by a processing device, e.g., by the processor 12 of system 10. These and numerous other embodiments within the scope of the following claims will be apparent to those skilled in the art.

What is claimed is:

1. A method of person tagging in an image processing system, the method comprising the steps of:
processing a sequence of images to generate a statistical model for each person to be tagged, the statistical model incorporating at least one appearance feature and at least one geometric feature of the tagged person;
applying the model to at least one subsequent image in order to perform at least one of a detection operation, a location operation and a tracking operation for the tagged person; and
controlling an action of the image processing system based on a result of the at least one operation;
wherein the statistical model generated for a given person $\Omega$ and image I comprises a likelihood probability function $$P(I \mid T, \xi, \Omega) = \sum_{pix \in I} P(pix \mid T, \xi, \Omega),$$

where r is an index to regions of similar appearance and N is a total number of such regions, r=1, 2, . . . N, is a linear transformation used to capture global motion of the person in the image space and $$P(pix \mid T, \xi, \Omega) = \max\left( P\left( \max_{r=1,\ldots,N} pix \mid r, T, \xi, \Omega \right) P(r \mid \xi, \Omega) \right),$$

where P(pix|r, T, $\xi$, $\Omega$) is the probability of observing pixel pix assuming that it belongs to an r-th region of the model on a pose $\xi$, and P(r|$\xi$, $\Omega$) is the prior probability of the region at that pose.

2. The method of claim 1 wherein the regions of similar appearance include a dummy region having a constant probability as follows:

$$P(pix|r_{occlusion}, T, \Sigma, \Omega)P(r_{occlusion}|\Sigma,\Omega)=P_{occlusion}.$$

3. The method of claim 1 wherein each of at least a subset of the pixels of the image I is characterized by a two-dimensional position vector x and by an appearance feature vector f such that:

$$P(pix|r,T,\Sigma,\Omega)=P(x|r,T,\Sigma,\Omega)P(f|r,T,\Sigma,\Omega),$$

Where P (x|r, T, $\Sigma$, $\Omega$) and P (f|r, T, $\Sigma$, $\Omega$) are approximated as Gaussian distributions over corresponding feature spaces.

* * * * *